(12) United States Patent
Dums et al.

(10) Patent No.: US 11,469,635 B2
(45) Date of Patent: Oct. 11, 2022

(54) ROTOR FOR AN ELECTRIC MACHINE

(71) Applicant: Dr. Ing. h.c. F. Porsche Aktiengesellschaft, Stuttgart (DE)

(72) Inventors: Karl Dums, Renningen (DE); Niklas Lamparsky, Leonberg (DE); Stefan Oechslen, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 193 days.

(21) Appl. No.: 16/846,656

(22) Filed: Apr. 13, 2020

(65) Prior Publication Data

US 2020/0328641 A1 Oct. 15, 2020

(30) Foreign Application Priority Data

Apr. 12, 2019 (DE) ..................... 10 2019 109 721.5

(51) Int. Cl.
*H02K 1/32* (2006.01)

(52) U.S. Cl.
CPC ...................... *H02K 1/32* (2013.01)

(58) Field of Classification Search
CPC .............................. H02K 1/2766; H02K 1/32
USPC .......................................................... 310/61
See application file for complete search history.

(56) References Cited

U.S. PATENT DOCUMENTS

| | | | | |
|---|---|---|---|---|
| 3,165,655 A | * | 1/1965 | Eis | H02K 5/128 310/54 |
| 3,243,616 A | * | 3/1966 | Tudge | H02K 3/14 310/54 |
| 8,405,262 B1 | * | 3/2013 | Beatty | H02K 1/20 310/58 |
| 9,768,666 B2 | * | 9/2017 | Buttner | H02K 1/20 |
| 2006/0226717 A1 | * | 10/2006 | Nagayama | H02K 9/14 310/58 |
| 2010/0102652 A1 | * | 4/2010 | Booth | H02K 9/08 310/54 |
| 2011/0278967 A1 | * | 11/2011 | Utaka | H02K 9/22 310/52 |
| 2012/0169158 A1 | * | 7/2012 | Buttner | H02K 9/20 310/54 |
| 2013/0221772 A1 | * | 8/2013 | Miyamoto | H02K 1/32 310/54 |
| 2014/0252894 A1 | * | 9/2014 | Dutau | H02K 1/325 310/59 |
| 2016/0043613 A1 | * | 2/2016 | Patel | H02K 9/20 310/54 |
| 2016/0056682 A1 | | 2/2016 | Cocks et al. | |

(Continued)

FOREIGN PATENT DOCUMENTS

| | | | | | |
|---|---|---|---|---|---|
| CN | 104767325 A | * | 7/2015 | | |
| EP | 3157138 A1 | * | 4/2017 | ............... | H02K 1/20 |

(Continued)

*Primary Examiner* — Alex W Mok
(74) *Attorney, Agent, or Firm* — Gerald E. Hespos; Michael J. Porco

(57) ABSTRACT

A rotor (1) for an electric machine has a sheet stack (2) arranged between a first end plate (3) and a second end plate (4). The first end plate and the second end plate (3, 4) are connected to each other by pipes (5) that extend at least partially through the sheet stack (2). Each pipe (5) has a cooling channel (6) for conducting a coolant. The pipes (5) and the first end plate (3) are constructed as an integral pipe/end plate (8).

3 Claims, 2 Drawing Sheets

(56) References Cited

U.S. PATENT DOCUMENTS

2016/0261158 A1* 9/2016 Horii .................. H02K 1/274
2017/0310190 A1* 10/2017 Degner ................ H02K 9/19
2018/0375395 A1* 12/2018 Yamagishi ............ H02K 1/32

FOREIGN PATENT DOCUMENTS

| KR | 10-2018-0094446 | 8/2018 |
|---|---|---|
| WO | 2012031694 | 3/2012 |

* cited by examiner

ROTOR FOR AN ELECTRIC MACHINE

CROSS REFERENCE TO RELATED APPLICATION

This application claims priority under 35 USC 119 to German Patent Appl. No. 10 2019 109 721.5 filed on Apr. 12, 2019, the entire disclosure of which is incorporated herein by reference.

BACKGROUND

Field of the Invention. The invention relates to a rotor for an electric machine having a sheet stack arranged between a first end plate and a second end plate. The first end plate and the second end plate are connected to each other by pipes that are arranged to extend at least partially through the sheet stack. Each pipe has a cooling channel for conducting a coolant.

WO 2012/031 694 A2 discloses a rotor of an electric machine. The rotor has pipes that extend between two end plates of the rotor to define a sheet stack of the rotor. The pipes are constructed as hollow securing pins and may be connected to the two end plates, for example, by a weld or a screw connection. A coolant can be directed through the pipes to cool the rotor, in particular the sheet stack of the rotor. However, the assembly of these rotors is often complex since a large number of operating steps are required to connect the pipes to the end plates.

An objective of the invention is to reduce the complexity of such a rotor.

SUMMARY

The invention relates to a rotor for an electric machine having a sheet stack arranged between a first end plate and a second end plate. The first and second end plates are connected to each other by pipes that extend at least partially through the sheet stack. Each pipe has a cooling channel for conducting a coolant. The pipes and the first end plate are constructed as an integral pipe/end plate.

The integral pipe/end plate avoids the complexity of connecting the individual pipes to the first end plate. The rotor can be assembled by placing the sheets of the sheet stack individually or in groups on the pipes of the pipe/end plate. It is not necessary to connect the pipes initially to the first end plate. Thus, the complexity for producing the rotor is reduced.

The pipe/end plate may be produced from a metal, for example, from iron, aluminum or a steel.

The pipe/end plate may be constructed as a cast component. The casting of the pipe/end plate affords the advantage that only relatively few operating steps are required to produce the pipes and the first end plate. The complexity for producing the rotor can thereby be reduced even more.

The pipe/end plate may comprise an end plate cooling channel that is connected in fluid terms to the cooling channels of the pipes. A coolant can be conducted into the pipes via the end plate cooling channel.

The pipes may have circular cross-sections. Thus, the pipes may have a relatively large surface to improve the heat exchange between the coolant in the respective pipe and the sheet stack that surrounds the pipe.

The pipes of an alternate embodiment may have a polygonal cross-section and the sheets of the sheet stack may have a recess that is adapted to the polygonal cross-section. Thus, an undesirable rotation of the sheets or the sheet stack when the pipes are introduced into the recesses can be prevented. For example, the pipes may have a triangular cross-section or a rectangular cross-section.

A hollow space may be arranged in the sheet stack in the region of a longitudinal axis of the sheet stack, in particular a rotation axis of the rotor. The hollow space is free from components so that the mass of the rotor is reduced. The hollow space can extend around the longitudinal axis of the sheet stack. The hollow space may have a substantially or completely cylindrical shape.

In this context, it is advantageous for the pipes to be arranged so as to extend partially inside the sheet stack and partially inside the hollow space. Such an embodiment facilitates the introduction of the pipes into the sheet stack.

The pipes may be arranged to extend completely inside the sheet stack to increase the thermal coupling between the pipes and the sheet stack.

The pipes may be connected to the second end plate by a screw connection. Thus, the pipes can be connected releasably to the pipes of the pipe/end plate.

The second end plate may comprise a return cooling channel that is connected in fluid terms to the cooling channels of first and second of the pipes in such a manner that a coolant that flows through the cooling channel of the first pipe is guided via the return cooling channel into the cooling channel of the second pipe. In this manner, a coolant circuit may be enabled, in which the coolant starting from the pipe/end plate flows through the first pipe to the second end plate, is redirected at that location and flows through the second pipe back to the first end plate of the pipe/end plate. With such an embodiment, both an inlet and an outlet of the coolant circuit may be arranged at the side of the first end plate so that the sealing of the coolant circuit is simplified. The pipe/end plate may have plural first pipes and plural second pipes so that more pipes are available for the influx to the second end plate and for the return from the second end plate. Thus, a larger region of the sheet stack can be cooled. The first pipes and the second pipes may be arranged alternately in the peripheral direction of the rotor so that a first pipe in each case has two adjacent second pipes and a second pipe in each case has two adjacent first pipes.

The invention also relates to an electric machine having a stator and the above-explained rotor. The electric machine may be an asynchronous machine, a synchronous machine, a permanently excited synchronous machine a separately excited synchronous machine.

Other details and advantages of the invention will be explained below with reference to the embodiments illustrated in the Figures.

DETAILED DESCRIPTION

Figure 1:
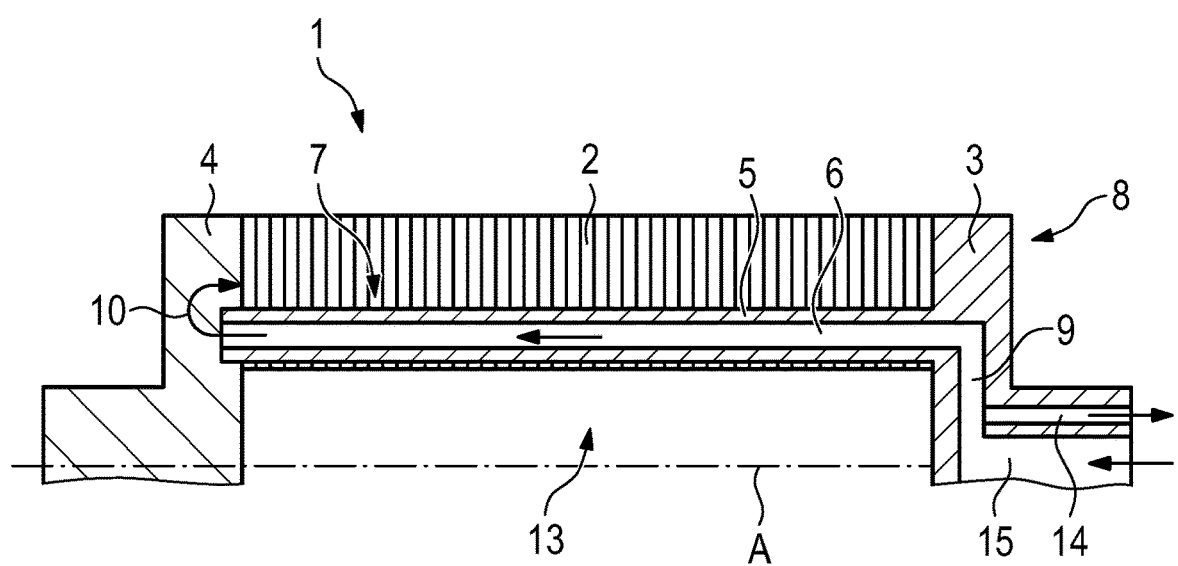
FIG. 1 is a sectioned illustration of a first embodiment of a rotor according to the invention along a longitudinal axis of the rotor, which shows one half of the rotor.

FIG. 1 is a sectioned illustration of a rotor 1 according to a first embodiment of the invention. The sectioned illustration shows only half of the substantially cylindrical rotor 1.

The rotor 1 may be used with an electric machine that is constructed as an asynchronous machine or a synchronous machine, such as a permanently excited synchronous machine or a separately excited synchronous machine.

The rotor 1 comprises a sheet stack 2 with a large number of individual sheets that form individual layers of the sheet stack 2. The sheets may be insulated electrically with respect to each other, for example, by means of an insulating coating of the sheets. Other components of the rotor 1 include two end plates 3, 4, between which the sheet stack 2 is clamped. The end plates 3, 4 are connected to each other by pipes 5 that extend through recesses in the sheets of the sheet stack 2. Each pipe 5 has a hollow pipe space that forms a cooling channel for conducting a coolant. To facilitate production of the rotor 1, the pipes 5 and the first end plate 3 are constructed as an integral pipe/end plate 8. The pipe/end plate 8 may be constructed as a cast component. Thus, the complex connection of separately produced pipes 5 and the first end plate 5 can be avoided.

The region of the first end plate 5 of the pipe/end plate 8 comprises an end plate cooling channel 9 that is connected in fluid terms to the cooing channels 6 of the pipes 5. Therefore, as indicated by the arrows in FIG. 1, the coolant can flow through the end plate cooling channel 9 into the cooling channels 6 of the pipes 5. Via the pipes 5, the coolant flows in the direction of the second end plate 4.

The pipes 5 are connected in the region of their open ends to the second end plate 4. This connection can be carried out by a screw connection. Alternatively, the pipes 5 can be welded to the second end plate 4.

According to a modification of the embodiment shown in FIG. 1, the pipes 5 can be arranged to extend through recesses in the end plate 4. These pipes 5 may be connected by a screw connection to a nut that is arranged on an outer side of the end plate 4 facing away from the sheet stack 2. The cooling channels 6 of the pipes 5 are in this case closed or connected to each other.

Figure 2:
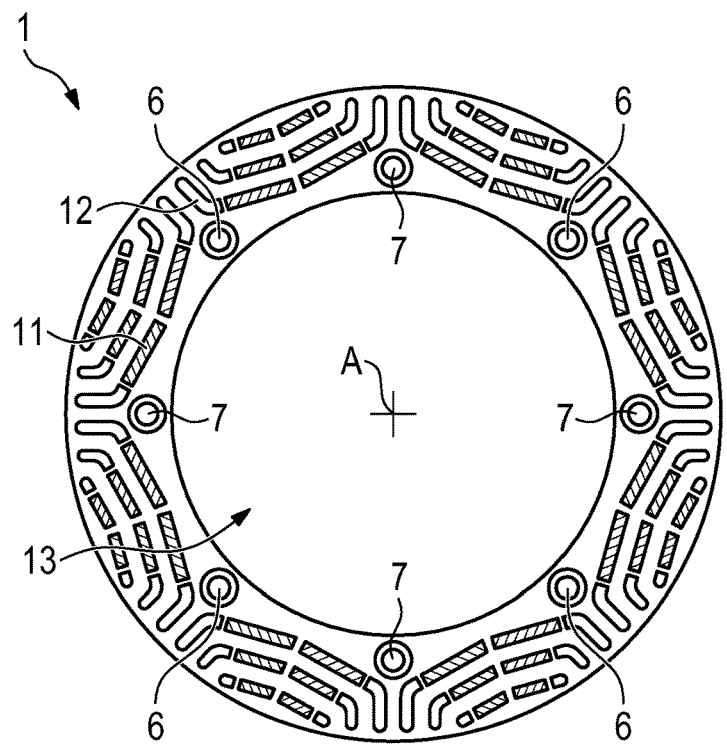
FIG. 2 is a sectioned illustration of the rotor according to FIG. 1 along a plane perpendicular to the longitudinal axis of the rotor.

As shown in FIG. 2, the pipe/end plate 8 comprises plural, in this instance precisely eight, pipes 5. The pipes 5 are arranged on a circle around the longitudinal axis A of the rotor so that the pipes all have an identical spacing from the longitudinal axis A, which coincides with the rotation axis of the rotor 1.

The second end plate 4 has a return cooling channel 10 that is connected to the cooling channels 6. The return cooling channel 10 produces a fluid connection between a first cooling channel 6 of a first rotor 5 and a second cooling channel 7 of a second pipe 5 that is adjacent to the first pipe so that a coolant flowing through the first cooling channel 6 of the first pipe 5 is directed via the return cooling channel 10 into the second cooling channel 7 of the second pipe 5. Thus, a circuit of the coolant starts from the first end plate 3 via the pipes 5, the second end plate 4, the pipes 5 to the first end plate 3, as indicated by the arrows in FIG. 1. The outlet 14 for the coolant from the first end plate 3 is spaced farther apart in a radial direction from the longitudinal axis A of the rotor 1 than the inlet 15 for the coolant. The inlet 14 and outlet 15 are not directly connected to each other in fluid terms within the first end plate.

FIGS. 1 and 2 further show that a hollow space 13 is provided in the region of the longitudinal axis A of the sheet stack 2. The hollow space 13 is free from components. In particular, no rotor shaft extends from the first end plate 3 to the second end plate 4 so that a weight-reduced construction of the rotor 1 is enabled.

Figure 3:
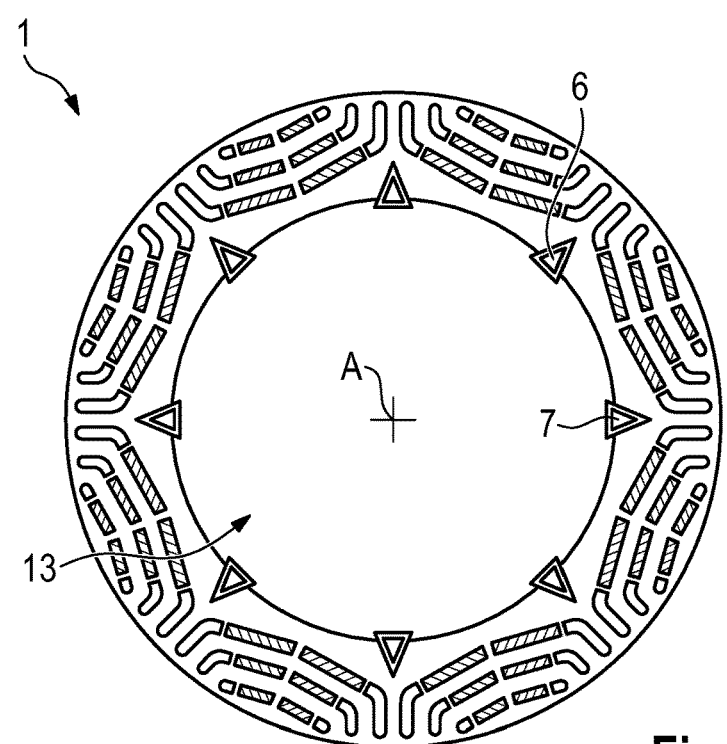
FIG. 3 is a sectioned illustration of a second embodiment of a rotor according to the invention along a plane perpendicular to the longitudinal axis of the rotor.

In the first embodiment, the pipes 5 are cylindrical pipes with a circular cross-section, and the pipes 5 extend completely inside the sheet stack 2. Thus, a particularly effective heat exchange between the coolant flowing through the pipes 5 and the sheet stack 2 and the permanent magnets 11 that are arranged inside the sheet stack can be enabled. In the illustrations of FIGS. 2 and 3, flow barriers 12 are indicated with shading.

FIG. 3 shows a rotor 1 according to a second embodiment. The rotor 1 of FIG. 3 corresponds to the rotor 1 according to the first embodiment with the difference that the pipes 5 have a polygonal, in this instance triangular, cross-section. In addition, the pipes 5 are not arranged to extend completely inside the sheet stack 2, but instead extend partially inside the sheet stack 2 and partially inside the hollow space 13.

The above-described rotors 1 for an electric machine comprise a sheet stack 2 that is arranged between a first end plate 3 and a second end plate 4. The first and the second end plates 3, 4 are connected to each other by pipes 5 that extend at least partially through the sheet stack 2 and that each have a cooling channel 6 for conducting a coolant. The pipes 5 and the first end plate 3 are constructed as an integral pipe/end plate 8 to facilitate the production of the rotor 1.

What is claimed is:

1. A rotor for an electric machine comprising: a sheet stack arranged between a first end plate and a second end plate, the first end plate and the second end plate are connected to each other by pipes that extend at least partially through the sheet stack each have a cooling channel for conducting a coolant, wherein:

the pipes and the first end plate define an integral pipe/end plate structure, a hollow space is arranged in a region of a longitudinal axis of the sheet stack, and the pipes are arranged to extend partially inside the sheet stack and partially inside the hollow space.

2. A method for manufacturing a rotor for an electric machine comprising:

forming an integral pipe/end plate structure having parallel pipes, each of the pipes having opposite first and second ends and pipe cooling channels extending between the opposite first and second ends, the integral pipe/end plate structure further having a first end plate integral with the first ends of the pipes, the first end plate having at least one first end plate cooling channel communicating with the pipe cooling channels;

assembling sheets individually or in groups onto the integral pipe/end plate structure by mounting the sheets at least partly onto the second ends of the pipes and moving the sheets toward the first end plate of the integral pipe/end plate structure; and mounting a second end plate onto the second ends of the pipes so that a second end plate cooling channel of the second end plate communicates with the pipe cooling channels.

3. The method of claim 2, wherein the step of forming the integral pipe/end plate structure is carried out by casting the pipes unitarily with the first end plate.

* * * * *